(12) United States Patent
Kataoka et al.

(10) Patent No.: US 11,433,924 B2
(45) Date of Patent: Sep. 6, 2022

(54) SYSTEM AND METHOD FOR CONTROLLING ONE OR MORE VEHICLES WITH ONE OR MORE CONTROLLED VEHICLES

(71) Applicant: Toyota Motor Engineering & Manufacturing North America, Inc., Plano, TX (US)

(72) Inventors: Yuta Kataoka, Mountain View, CA (US); Kentaro Oguchi, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 77 days.

(21) Appl. No.: 16/863,214

(22) Filed: Apr. 30, 2020

(65) Prior Publication Data

US 2021/0339777 A1 Nov. 4, 2021

(51) Int. Cl.
*B60W 60/00* (2020.01)
*G08G 1/00* (2006.01)
*G06N 3/08* (2006.01)
*G06N 3/06* (2006.01)

(52) U.S. Cl.
CPC .. *B60W 60/00276* (2020.02); *B60W 60/0011* (2020.02); *B60W 60/0018* (2020.02); *G06N 3/06* (2013.01); *G06N 3/08* (2013.01); *G08G 1/20* (2013.01)

(58) Field of Classification Search
CPC ....... B60W 60/00276; B60W 60/0018; B60W 60/0011; G08G 1/20; G06N 3/08; G06N 3/06
See application file for complete search history.

(56) References Cited

U.S. PATENT DOCUMENTS 10,254,759 B1\* 4/2019 Faust ................. B60W 30/00
2007/0282519 A1\* 12/2007 Emam ................. G08G 1/017
701/117

(Continued)

OTHER PUBLICATIONS

Wu et al., "Flow: A Modular Learning Framework for Autonomy in Traffic," arXiv:1710.05465v2 [cs.AI] Oct. 1, 2019 (17 pages).

(Continued)

*Primary Examiner* — James J Lee
*Assistant Examiner* — Matthew L Parulski
(74) *Attorney, Agent, or Firm* — Christopher G. Darrow; Darrow Mustafa PC

(57) ABSTRACT

A system and method for controlling one or more vehicles with one or more controlled vehicles may include one or more processors and a memory in communication with the one or more processors. The memory may include one or more modules that cause the one or more modules to obtain a state of an environment having a universe of vehicles operating therein, identify one or more anomaly vehicles from the universe of vehicles operating in the environment, select one more actions to control a plurality of controlled vehicles to control the operation of one or more anomaly vehicles and direct the plurality of controlled vehicles execute the one or more actions. The selecting of one or more actions may be performed by utilizing a reinforcement-learning trained algorithm.

19 Claims, 9 Drawing Sheets

(56) References Cited

U.S. PATENT DOCUMENTS

| | | | |
|---|---|---|---|
| 2008/0095403 A1* | 4/2008 | Benhammou | G06T 7/80 |
| | | | 382/104 |
| 2019/0049997 A1* | 2/2019 | Battles | G07C 5/008 |
| 2019/0088135 A1* | 3/2019 | Do | G05D 1/0055 |
| 2019/0188800 A1 | 6/2019 | Slusar et al. | |
| 2019/0310648 A1 | 10/2019 | Yang et al. | |
| 2020/0174471 A1* | 6/2020 | Du | G06N 3/084 |

OTHER PUBLICATIONS

Vinitsky et al., "Benchmarks for reinforcement learning in mixed-autonomy traffic," 2nd Conference on Robot Learning (CoRL 2018), Zurich, Switzerland (11 pages).

Wu et al., "Stabilizing traffic with autonomous vehicles," 2018 IEEE International Conference on Robotics and Automation (ICRA), pp. 6012-6018 (2018).

Zheng et al., "Smoothing traffic flow via control of autonomous vehicles," arXiv:1812.09544v1 [math.OC] Dec. 22, 2018 (38 pages).

Yu et al., "Reinforcement Learning for Cooperative Overtaking," AAMAS '19: Proceedings of the 18th International Conference on Autonomous Agents and MultiAgent Systems, pp. 341-349 (2019).

Hoel et al., "Combining Planning and Deep Reinforcement Learning in Tactical Decision Making for Autonomous Driving," arXiv:1905.02680v1 [cs.RO] May 6, 2019 (12 pages).

\* cited by examiner

SYSTEM AND METHOD FOR CONTROLLING ONE OR MORE VEHICLES WITH ONE OR MORE CONTROLLED VEHICLES

TECHNICAL FIELD

The subject matter described herein relates, in general, to systems and methods for controlling traffic using one or more controlled vehicles.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some have observed that vehicle-related traffic can move more efficiently when vehicles work in concert to reduce congestion, braking events, sudden lane changes, anticipate future obstructions, and the like. Some vehicles are autonomous vehicles that require little to no input from an occupant of the vehicle to maneuver the vehicle from one destination to another safely. These autonomous vehicles may have the ability to communicate with each other, as well as receive information from other sources regarding the presence of traffic, upcoming obstructions, and the like. In addition, because these autonomous vehicles may be able to communicate with each other, these autonomous vehicles can work in concert to more effectively reduce traffic and more efficiently travel from one location to another.

However, not all vehicles are autonomous vehicles. As such, many vehicles are piloted by a human operator. In these situations, the effectiveness of autonomous vehicles to reduce traffic and more efficiently travel from one location to another may be impacted by the actions taken by human operators when piloting their vehicle. In some cases, actions taken by human operators may be helpful to reduce traffic and/or not negatively impact traffic and travel efficiency. However, in other situations, the actions taken by human drivers may be counterproductive, cause more traffic, and reduce travel efficiency. Furthermore, there may be situations where a specific subset of vehicles piloted by human operators are piloted in a manner that does not affect travel efficiency. In contrast, another subset of vehicles piloted by human operators may be the cause of more traffic and reductions in travel efficiency.

SUMMARY

This section generally summarizes the disclosure and is not a comprehensive explanation of its full scope or all its features.

In one embodiment, a traffic control system may include one or more processors and a memory in communication with the one or more processors. The memory may include an environment module, an anomaly detection module, an action selector module, and/or a direction module. The environment module may include instructions that, when executed by the one or more processors, causes the one or more processors to obtain a state of an environment having a universe of vehicles operating therein.

The anomaly detection module may include instructions that, when executed by the one or more processors, causes the one or more processors to identify one or more anomaly vehicles from the universe of vehicles operating in the environment. A vehicle may be considered an anomaly vehicle based on the performance of one or more abnormal actions by the vehicle.

The action selector module may include instructions that, when executed by the one or more processors, causes the one or more processors to select one more actions to control one or more controlled vehicles to control the operation of one or more anomaly vehicles. The selecting of one or more actions may be performed by utilizing a reinforcement-learning trained algorithm. The direction module may include instructions that, when executed by the one or more processors, causes the one or more processors to direct the one or more controlled vehicles execute the one or more actions.

In another embodiment, a method for controlling one or more vehicles with one or more controlled vehicles may include the steps of obtaining a state of an environment having a universe of vehicles operating therein, identifying one or more anomaly vehicles from the universe of vehicles operating in the environment, selecting one more actions to control the one or more controlled vehicles to control the operation of one or more anomaly vehicles, and directing the one or more controlled vehicles execute the one or more actions. Like before, a vehicle may be considered an anomaly vehicle based on the performance of one or more abnormal actions by the vehicle.

In yet another embodiment, a non-transitory computer-readable medium storing instructions for controlling one or more vehicles with one or more controlled vehicles that, when executed by one or more processors, may cause the one or more processors to obtain a state of an environment having a universe of vehicles operating therein, identify one or more anomaly vehicles from the universe of vehicles operating in the environment, select one more actions to control the one or more controlled vehicles to control the operation of one or more anomaly vehicles, and direct the one or more controlled vehicles execute the one or more actions. Again, a vehicle may be considered an anomaly vehicle based on the performance of one or more abnormal actions by the vehicle.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Described are a system, method, and non-transitory medium for controlling one or more anomaly vehicles by one or more controlled vehicles. In one example, the system can detect one or more anomaly vehicles that are operating in an environment. The anomaly vehicles may be vehicles that have performed one or more abnormal actions, such as traveling at a speed outside a certain range, excessive lane changes, sudden braking events, sudden acceleration events, and the like. These abnormal actions by the anomaly vehicle may impact the flow of traffic in a negative way.

After identifying one or more anomaly vehicles, the system can determine actions that should be taken by one or more controlled vehicles to improve the flow of traffic. These actions taken by the controlled vehicles may be such that the controlled vehicles are operated in such a way that they impact actions taken by the anomaly vehicles. For example, if an anomaly vehicle is traveling at an excessive speed, one or more controlled vehicles may provide a physical hindrance to the anomaly vehicle to control the speed of the anomaly vehicle. If, in another example, the anomaly vehicle is performing too many sudden lane changes, the controlled vehicles can surround the anomaly vehicle and prevent the anomaly vehicle from performing too many lane changes.

The actions taken by the controlled vehicles are based on a trained reinforcement-learning algorithm. The trained reinforcement-learning algorithm may be trained such that a reward function is maximized. The reward function could be based on a number of different factors, such as reducing the travel time of nearby vehicles, reducing sudden braking events, reducing sudden acceleration events, etc., all in an effort to improve the overall efficiency of vehicles traveling from one destination to another. As such, the controlled vehicles can be directed to neutralize and/or minimize actions taken by anomaly vehicles that negatively impact one or more factors, such as travel time of other vehicles, safety, and the like.

Figure 1:
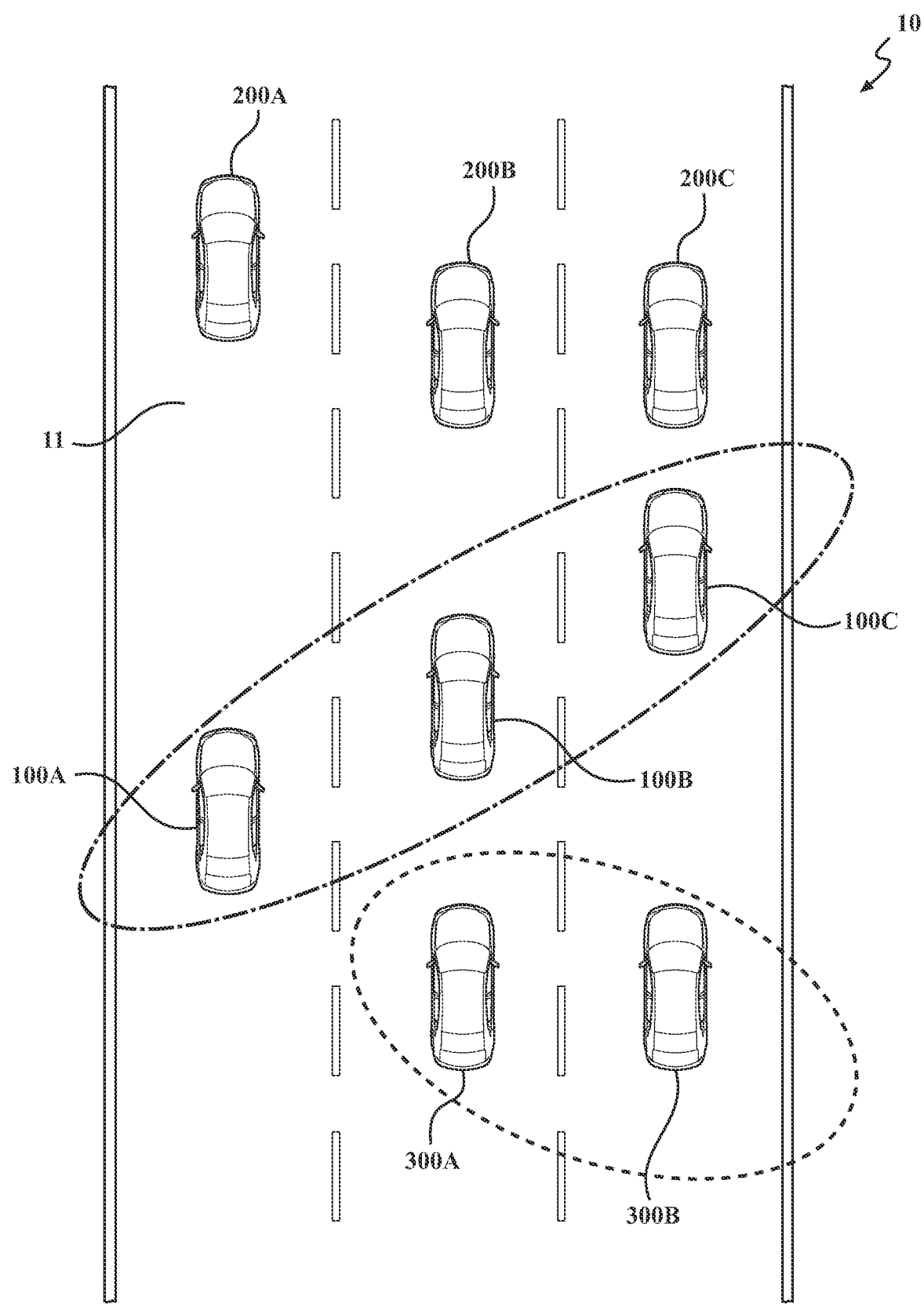
FIG. 1 illustrates an example scenario having a plurality of vehicles that utilize a system for controlling traffic.

For example, referring to FIG. 1, a scenario 10 involving vehicles 100A-100C, 200A-200C, and 300A-300B traveling down a roadway 11 having multiple lanes is shown. The scenario 10 is just but one example provided to improve the understanding of the systems and methods described in this specification. As such, the scenario 10 could vary significantly regarding the type of roadway 11, to the numbers or presence of vehicles 100A-100C, 200A-200C, and/or 300A-300B.

Here, the scenario 10 illustrates three types of vehicles. The vehicles 100A-100C are controlled vehicles. Moreover, the controlled vehicles 100A-100C may be controlled in such a way to improve the flow of traffic of the vehicles 100A-100C, 200A-200C, and/or 300A-300B traveling down a roadway 11. The vehicles 200A-200C and 300A-300B are non-controlled vehicles. Moreover, the non-controlled vehicles 200A-200C and 300A-300B are either individually piloted by the occupants of these vehicles or by an autonomous or semi-autonomous driving system.

In this example, a system for controlling the controlled vehicles 100A-100C has determined that the vehicles 300A-300B are anomaly vehicles. Moreover, the anomaly vehicles 300A-300B are determined by the system to be anomaly vehicles based on one or more abnormal actions taken by the vehicles 300A-300B. These abnormal actions can include any actions that may negatively impact the flow of traffic in the scenario 10. For example, these abnormal actions can include speeds that fall either above or below a certain range, excessive lane changes, sudden braking events, sudden acceleration events, use of lights/horns, or other actions that may cause traffic on the roadway 11 to travel less efficiently or in a less safe manner.

When the system determines the presence of one or more anomaly vehicles, such as anomaly vehicles 300A-300B, the system may determine, using a trained reinforcement-learning algorithm, to instruct the controlled vehicles 100A-100C to take any one of a number of different actions to minimize the impact of the anomaly vehicles 300A-300B on the flow traffic in the roadway 11. Examples of different actions taken by controlled vehicles 100A-100C will be described later in this specification. As such, by neutralizing or minimizing the impact of the anomaly vehicles 300A-300B by one or more controlled vehicles 100A-100C, the flow of traffic can proceed in a more efficient and safe manner.

Figure 2:
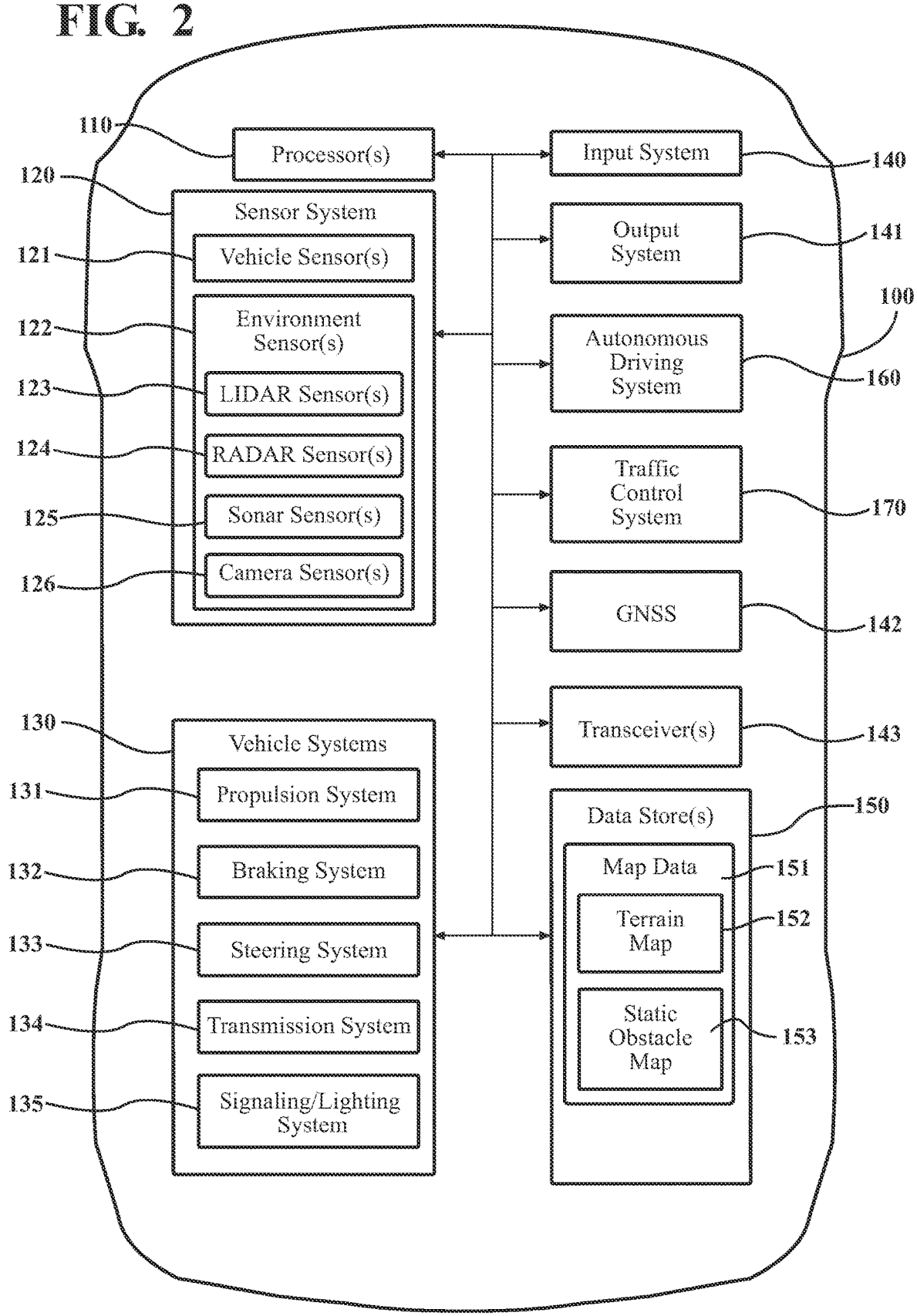
FIG. 2 illustrates a controlled vehicle having a system for controlling traffic.

Referring to FIG. 2, an example of a controlled vehicle 100 is illustrated. As used herein, a "vehicle" is any form of powered transport. In one or more implementations, the controlled vehicle 100 is an automobile. While arrangements will be described herein with respect to automobiles, it will be understood that embodiments are not limited to automobiles. In some implementations, the controlled vehicle 100 may be any robotic device or form of powered transport that, for example, includes one or more automated or autonomous systems, and thus benefits from the functionality discussed herein.

In various embodiments, the automated/autonomous systems or combination of systems may vary. For example, in one aspect, the automated system is a system that provides autonomous control of the vehicle according to one or more levels of automation, such as the levels defined by the Society of Automotive Engineers (SAE) (e.g., levels 0-5). As such, the autonomous system may provide semi-autonomous control or fully autonomous control, as discussed in relation to an autonomous driving module(s) 160, which will be discussed later in this specification.

The controlled vehicle 100 also includes various elements. It will be understood that in various embodiments it may not be necessary for the controlled vehicle 100 to have all the elements shown in FIG. 2. The controlled vehicle 100 can have any combination of the various elements shown in FIG. 2. Further, the controlled vehicle 100 can have additional elements to those shown in FIG. 2. In some arrangements, the controlled vehicle 100 may be implemented without one or more of the elements shown in FIG. 2. While the various elements are shown as being located within the controlled vehicle 100 in FIG. 2, it will be understood that one or more of these elements can be located external to the controlled vehicle 100. Further, the elements shown may be physically separated by large distances and provided as remote services (e.g., cloud-computing services).

Some of the possible elements of the controlled vehicle 100 are shown in FIG. 1 and will be described along with subsequent figures. However, a description of many of the elements in FIG. 2 will be provided after the discussion of the other figures for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. The embodiments described herein may be practiced using various combinations of these elements.

In either case, the controlled vehicle 100 includes a traffic control system 170. The traffic control system 170 may be incorporated within an autonomous driving module(s) 160 or may be separate as shown. The traffic control system 170 may cause the controlled vehicle 100 to identify the presence of any anomaly vehicles that are performing abnormal actions that are hindering the flow traffic and then engage these anomaly vehicles to reduce and/or minimize the impact of the anomaly vehicles on the flow of traffic to improve efficiency and/or safety.

In this example, the traffic control system 170 is located within the controlled vehicle 100. However, the traffic control system 170 may be located remotely from the controlled vehicle 100. For example, the traffic control system 170 could be in a central server, roadside unit, and the like and then may provide directions for controlling the controlled vehicle 100 to neutralize and/or minimize the actions performed by anomaly vehicles or pother actions described related to the traffic control system 170.

Figure 3:
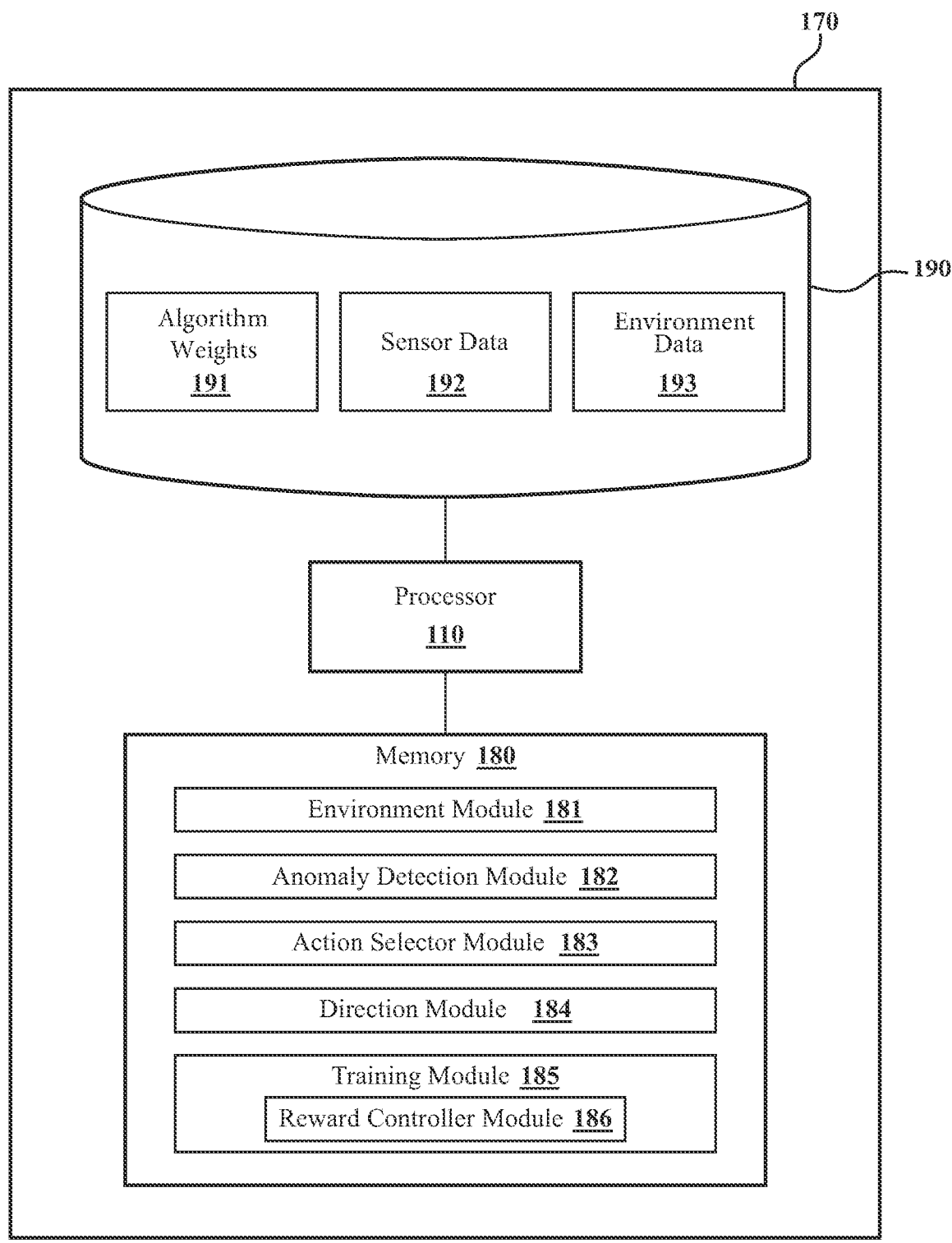
FIG. 3 illustrates a more detailed view of the system for controlling traffic of FIG. 2.

With that in mind, reference is made to FIG. 3, which illustrates one embodiment of the traffic control system 170. As shown, the traffic control system 170 includes a processor(s) 110. Accordingly, the processor(s) 110 may be a part of the traffic control system 170 or the traffic control system 170 may access the processor(s) 110 through a data bus or another communication path. In one or more embodiments, the processor(s) 110 is an application-specific integrated circuit that is configured to implement functions associated with an environment module 181, an anomaly detection module 182, an action selector module 183, a direction module 184, and a training module 185 that may include a reward controller module 186.

In general, the processor(s) 110 may be an electronic processor such as a microprocessor that can perform various functions as described herein. In one embodiment, the traffic control system 170 includes a memory 180 that stores the environment module 181, the anomaly detection module 182, the action selector module 183, the direction module 184, and the training module 185 that may include the reward controller module 186. The memory 180 is a random-access memory (RAM), read-only memory (ROM), a hard disk drive, a flash memory, or other suitable memory for storing the modules 181-186. The modules 181-186 are, for example, computer-readable instructions that, when executed by the processor(s) 110, cause the processor(s) 110 to perform the various functions disclosed herein.

Furthermore, in one embodiment, the traffic control system 170 includes a data store 190. The data store 190 is, in one embodiment, an electronic data structure such as a database that is stored in the memory 180 or another memory and that is configured with routines that can be executed by the processor(s) 110 for analyzing stored data, organizing stored data, and so on. Thus, in one embodiment, the data store 190 stores data used by the modules 181-186 in executing various functions. In one embodiment, the data store 190 includes data related to reinforcement learning algorithm weights 191 that impact the operation of the reinforcement-learning algorithm that controls the actions of one or more controlled vehicles, such as the controlled vehicle 100. The data store 190 may also include sensor data 192 collected from one or more sensors that form the sensor system 120, which will be described in greater detail later in this specification. The data store 190 may also store state data 193 that relates to the state of the environment in which the controlled vehicle 100 is operating within.

Accordingly, the environment module 181 generally includes instructions that function to control the processor(s) 110 to obtain a state of an environment having a universe of vehicles operating therein. The state of the environment may be obtained from one or more sources. For example, referring to FIG. 1, the controlled vehicle 100 may include a sensor system 120. The sensor system 120 may include vehicle sensor(s) 121 that measure one or more vehicle dynamics, such as acceleration, yaw, pitch, direction, and the like. The controlled vehicle 100 may also include environment sensor(s) 122 that can detect one or more objects, such as other vehicles operating within the environment. As such, the environment sensor(s) 122 may be able to provide information regarding the state of the environment near the controlled vehicle 100.

In one example, the environment sensor(s) 122 may include any one of several different sensors. As an example, in one or more arrangements, the environment sensor(s) 122 can include one or more LIDAR sensors 123, one or more radar sensors 124, one or more sonar sensors 125, and/or one or more cameras 126. In one or more arrangements, the one or more cameras 126 can be high dynamic range (HDR) cameras or infrared (IR) cameras.

Information regarding the state of the environment can also be obtained from systems external from the controlled vehicle 100. For example, state information may be obtained from external devices, such as other vehicles, roadside units, central servers, and like by communicating with other vehicles, roadside units, central servers, and the like via a wired or wireless connection. If the traffic control system 170 is located within a vehicle, such as the controlled vehicle of FIG. 2, the state information will be received wirelessly using one or more transceiver(s) 143. The transceiver(s) 143 may be able to communicate with external devices using any one of a number different communication methodologies, such as Bluetooth, Wi-Fi, dedicated short-range communication (DSRC), cellular V2X (C-V2X), cellular communication methodologies, combinations thereof, and the like. State information may be captured from these external devices using external sensors or by using information generated from other vehicles. For example, other vehicles may be able to provide information regarding location, acceleration events, braking events, lane change events, and the like of one or more vehicles operating within the environment. The system can be provided as part of the state information regarding the environment.

Further, the state information may include map-related data regarding one or more roadways that the controlled vehicle 100 is operating on. In one example, one or more data stores 150, which may be like the data store 190, may include map data 151.

The map data 151 can include maps of one or more geographic areas. In some instances, the map data 151 can include information or data on roads, traffic control devices, road markings, structures, features, and/or landmarks in the one or more geographic areas. The map data 151 can be in any suitable form. In some instances, the map data 151 can include aerial views of an area. In some instances, the map data 151 can include ground views of an area, including 360-degree ground views. The map data 151 can include measurements, dimensions, distances, and/or information for one or more items included in the map data 151 and/or relative to other items included in the map data 151. The map data 151 can include a digital map with information about road geometry. The map data 151 can be high quality and/or highly detailed.

In one or more arrangements, the map data 151 can include one or more terrain map(s) 152. The terrain map(s) 152 can include information about the ground, terrain, roads, surfaces, and/or other features of one or more geographic areas. The terrain map(s) 152 can include elevation data in the one or more geographic areas. The map data 151 can be high quality and/or highly detailed. The terrain map(s) 152 can define one or more ground surfaces, which can include paved roads, unpaved roads, land, and other things that define a ground surface.

In one or more arrangements, the map data 151 can include one or more static obstacle map(s) 153. The static obstacle map(s) 153 can include information about one or more static obstacles located within one or more geographic areas. A "static obstacle" is a physical object whose position does not change or substantially change over a period and/or whose size does not change or substantially change over a period. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 153 can have location data, size data, dimension data, material data, and/or other data associated with it. The static obstacle map(s) 153 can include measurements, dimensions, distances, and/or information for one or more static obstacles. The static obstacle map(s) 153 can be high quality and/or highly detailed. The static obstacle map(s) 153 can be updated to reflect changes within a mapped area.

The state data may also utilize the location of the controlled vehicle 100. In order to obtain the location of the controlled vehicle 100, the controlled vehicle 100 may include a global navigation satellite system (GNSS) 142. The GNSS 142 may utilize signals sent from a constellation of satellites from space that transmit positioning and timing data to GNSS 142. The GNSS 142 then utilizes this information to determine the location of the controlled vehicle 100.

As such, one example, the state data may include some or all of information generated from the sensor system 120, the map data 151, and information collected from external devices, such as other vehicles, central servers, roadside units, and the like, by the transceiver(s) 143.

Referring to FIG. 3, the anomaly detection module 182 may include instructions that, when executed by the processors(s) 110, cause the processors(s) 110 to identify one or more anomaly vehicles from the universe of vehicles operating in the environment. Moreover, in one example, based on the state information received by the environment module 181, the anomaly detection module 182 may cause the processor(s) 110 to determine the presence of one or more vehicles in the environment. Furthermore, the anomaly detection module 182 may monitor the movement of the vehicles in the environment over a period of time to determine if they are performing abnormal actions and, if they are performing abnormal actions, identify the vehicles as anomaly vehicles.

In one example, the anomaly detection module 182 causes the processor(s) 110 to consider the following as abnormal actions of detected and/or known vehicles: vehicle speed outside of a predetermined range, number of lane changes over a period of time, sudden acceleration events, sudden braking events, and/or use of lights/horns/hazard signal/turn signals, etc. These abnormal actions are just an example of some of the abnormal actions that may be determined by the anomaly detection module 182 in determining if a vehicle is an anomaly vehicle.

For example, vehicle speed can be useful to determine if a vehicle is performing abnormal actions and is an anomaly vehicle. For example, if a vehicle is traveling a set amount either above or below the posted speed limit, such as 10 mph, the vehicle may be determined to be an anomaly vehicle. In other examples, the speed of the vehicle may be compared to the speed of other vehicles and/or the overall speed of traffic. For example, if a vehicle is traveling near the posted speed limit, but is traveling 20% faster than other vehicles, the vehicle may be determined to be an anomaly vehicle.

With regards to sudden acceleration and/or braking events, the anomaly detection module 182 may cause the processor(s) 110 to consider sudden acceleration/deceleration of a vehicle and/or the application of the accelerator or the brake pedal by the occupant of the suspected anomaly vehicle. In one example, the environment sensor(s) 122 of the controlled vehicle 100 may be able to sense acceleration/deceleration of any nearby vehicles in order to determine if these nearby vehicles are anomaly vehicles. In another example, the traffic control system 170 may utilize the transceiver(s) 143 to receive information from one or more vehicles regarding the application of the accelerator/brake pedal by the occupant of a vehicle to determine if the vehicle is an anomaly vehicle.

With regards to excessive lane changes, the anomaly detection module 182 may cause the processor(s) 110 to consider how often and/or how quickly a vehicle changes lanes. For example, if a vehicle is changing lanes several times every minute, the vehicle may be determined as an anomaly vehicle. In other examples, the anomaly detection module 182 may cause the processor(s) 110 to determine how quickly a vehicle changes from one lane to another. How quickly a vehicle changes lanes may be based on the overall speed of the vehicle performing the lane change. For example, a vehicle traveling rapidly, such as on an expressway may change lanes more slowly to prevent a rollover accident. Conversely, a vehicle traveling much slower may change lanes more rapidly due to the smaller risk of a rollover at lower speeds. The processor(s) 110 may also perform a comparison between how often and how quickly other nearby vehicles change lanes and determine if any vehicle is acting as an outlier. Outlier vehicles may be determined to be anomaly vehicles.

The anomaly detection module 182 may also cause the processor(s) 110 to consider other features of vehicles to determine if the vehicle should be classified as an anomaly vehicle. For example, the anomaly detection module 182 may cause the processor(s) 110 to determine if any vehicles have prolonged use of turn signals, high beam lights, hazard lights, horns, and the like. A determination may be made by utilizing one or more of the environment sensor(s) 122 of the controlled vehicle 100 and/or by receiving information from other vehicles by the transceiver(s) 143. Based on this information, the processor(s) 110 may classify one or more vehicles as anomaly vehicles.

The action selector module 183 may include instructions that cause the processor(s) 110 to select one more actions to control one or more controlled vehicles to control the operation of one or more anomaly vehicles. As stated when describing FIG. 1, the controlled vehicles may include one or more controlled vehicles, such as controlled vehicles 100A-100C. The action selector module 183 causes the processor(s) 110 to instruct one or more controlled vehicles, such as controlled vehicles 100A-100C to either individually or cooperatively control the actions of one or more anomaly vehicles, such as anomaly vehicles 300A-300B. As will be described later in this specification, the action selector module 183 may utilize one or more reinforcement learning trained algorithms to select the appropriate action for the controlled vehicle 100 to perform to neutralize and/or minimize actions taken by anomaly vehicles that impact the flow of traffic and/or safety of vehicles.

The direction module 184 may include instructions that cause the processor(s) 110 to direct one or more controlled vehicles, such as controlled vehicles 100A-100C of FIG. 1 to control the actions of one or more anomaly vehicles, such as anomaly vehicles 300A-300B, based on the actions selected by the action selector module 183. As such, the processor(s) 110 may be able to control one or more vehicle systems 130. Various examples of the one or more vehicle systems 130 are shown in FIG. 2. However, the controlled vehicle 100 can include more, fewer, or different vehicle systems. It should be appreciated that although vehicle systems are separately defined, each or any of the systems or portions thereof may be otherwise combined or segregated via hardware and/or software within the controlled vehicle 100. The controlled vehicle 100 can include a propulsion system 131, a braking system 132, a steering system 133, a transmission system 134, and/or a signaling system 135. Each of these systems can include one or more devices, components, and/or a combination thereof, now known or later developed.

The ability to control the actions of one or more anomaly vehicles may be caused by having one or more controlled vehicles interact, either cooperatively or individually, with the anomaly vehicles in such a way that the operator or the autonomous vehicle system of the anomaly vehicles change their course of action to either minimize or neutralize the impact of the anomaly vehicles on the flow of traffic and/or safety of other vehicles. Several different examples of how the controlled vehicles can minimize or neutralize the impact of the actions by the anomaly vehicles can be performed.

For example, referring to FIGS. 6A-6E several different examples of different actions taken by controlled vehicles, either individually or cooperatively, to control the actions of one or more anomaly vehicles is shown. For example, referring to FIG. 6A, in this example, it has been determined that vehicles 300A-300B are anomaly vehicles and/or performing one or more abnormal actions, as described in the paragraphs above. In this example, the controlled vehicles 100A-100D essentially "box in" the anomaly vehicles 300A-300B as indicated by the circle 104. In this example, the controlled vehicles 100A-100D can prevent the anomaly vehicles 300A-300B from impacting the flow of traffic involving other vehicles, such as vehicles 200A-200B. The controlled vehicles 100A-100D may then either cause the anomaly vehicles 300A-300B to come to a complete stop or control the speed and/or other movements of the anomaly vehicles 300A-300B.

Figure 6A:
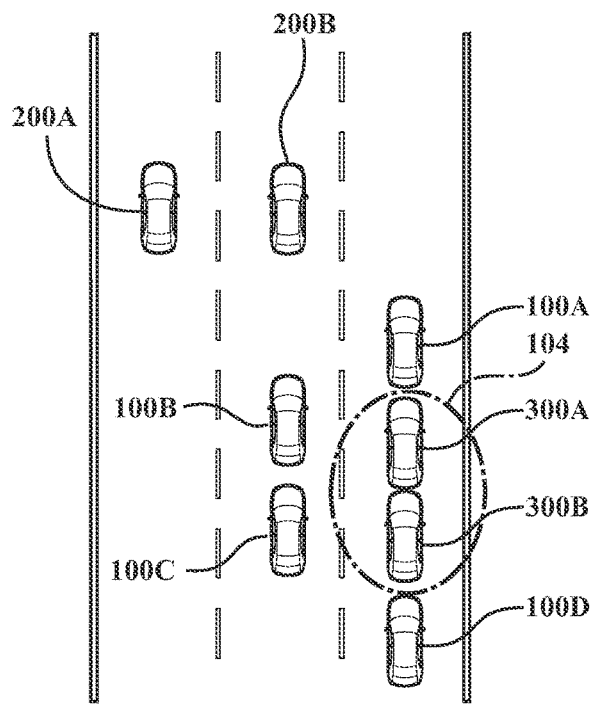
FIGS. 6A-6E illustrate different scenarios for controlling anomaly vehicles with one or more controlled vehicles.
Figure 6B:
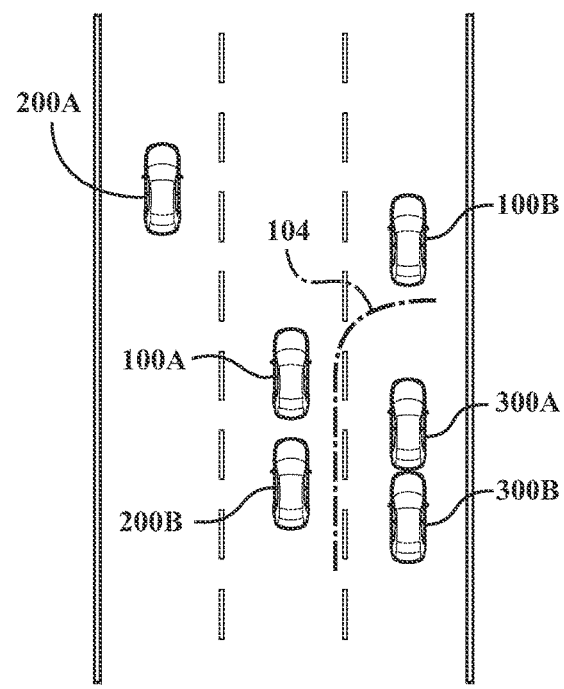

Referring to FIG. 6B, another example illustrates a scenario wherein the controlled vehicles 100A-100B prevent the anomaly vehicles 300A-300B from performing one or more lane changes. It should be noted that, in this example, the controlled vehicles 100A and 100B may be able to take advantage of the presence of other obstacles or other non-controlled vehicles, such as the vehicle 200B to effectively prevent the anomaly vehicles 300A-300B from performing a lane change, thus keeping the anomaly vehicles 300A-300B on one side of line 104.

Figure 6C:
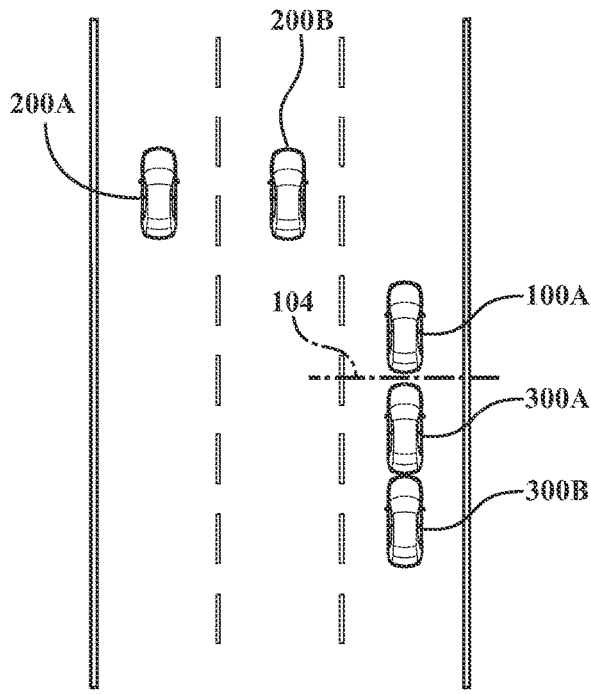

Referring to FIG. 6C, in this example, the controlled vehicle 100A slows the speed of one or more anomaly vehicles 300A and/or 300B. In this example, the controlled vehicle 100A prevents or slows the forward progress of one or more anomaly vehicles 300A and/or 300B, as indicated by the line 104, thus causing the anomaly vehicles 300A and/or 300B to travel at the same or similar speed as the controlled vehicle 100A.

Figure 6D:
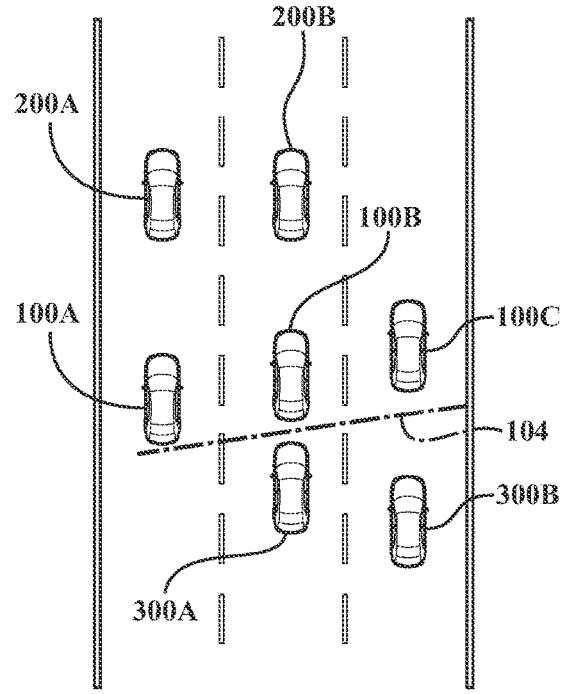
Figure 6E:
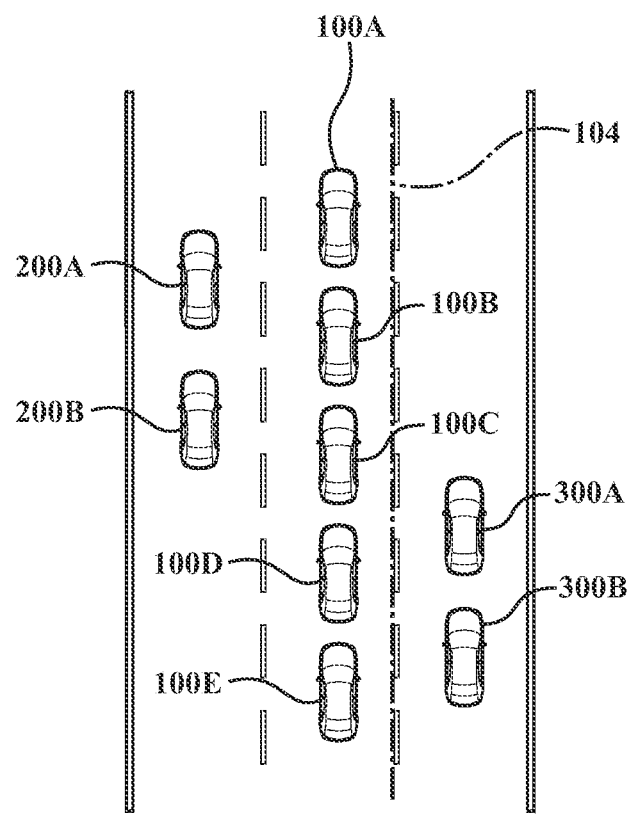

Referring to FIG. 6D, in this example, the controlled vehicles 100A-100C prevent the overtaking of the anomaly vehicles 300A-300B, as indicated by line 104. Essentially, the controlled vehicles 100A-100C block each of the lanes of the road, thereby preventing the anomaly vehicles 300A-300B from overtaking any of the controlled vehicles 100A-100C. Referring to FIG. 6E, in this example, the controlled vehicles 100A-100E essentially block the anomaly vehicles 300A-300B into a single lane, thereby preventing the anomaly vehicles 300A-300B from impacting the flow traffic in any of the other lanes.

The examples given in FIGS. 6A-6E are only examples that any one of several different actions could be taken by the controlled vehicles to minimize or neutralize actions taken by the anomaly vehicles.

The action selector module 183 may contain a reinforcement learning trained algorithm that has been trained to select the appropriate action. Reinforcement learning is an area of machine learning concerned with how software agents ought to take actions in an environment in order to maximize the cumulative reward. As the reinforcement-learning algorithm is trained, a reward based on a reward function is generated, and one or more weights of the reinforcement learning trained algorithm are adjusted based on the generated reward.

As such, regarding the training module 185, which may also include a reward controller module 186, the training module 185 causes the one or more processor(s) 110 to train the reinforcement-learning algorithm. In one example, the reward controller module 186 causes the processor(s) 110 to generate a reward based on a reward function and adjust one or more reinforcement learning algorithm weights 191 of the reinforcement-learning trained algorithm based on the reward.

Figure 4:
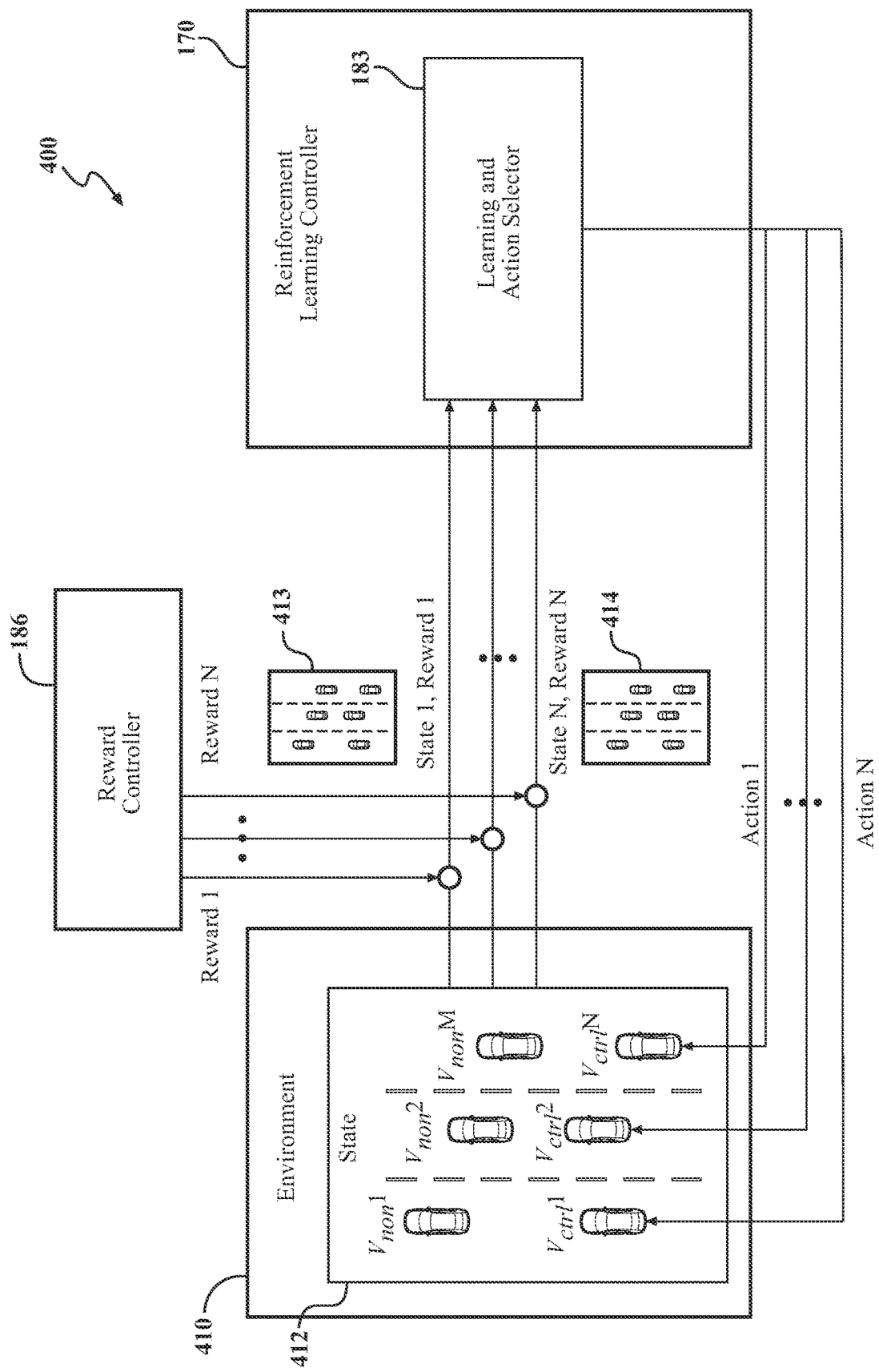
FIG. 4 illustrates a flow diagram for training the system for controlling traffic.

In order to better explain this concept, reference is made to FIG. 4, which illustrates a flow diagram 400 for training the traffic control system 170. During the learning phase, the state 412 regarding the environment 410 is provided (states 413 and 414) to the action selector module 183 of the traffic control system 170. A reward controller module 186 calculates a reward based on the current state. As this occurs, one or more weights of the reinforcement-learning algorithm are adjusted to improve the determinations of actions selected by the action selector module 183. Over time, the reinforcement-learning algorithm is trained to appropriately select any one of the actions described in the specification to control the flow of traffic and minimize and/or neutralize actions taken by anomaly vehicles that may impact the flow of traffic.

As stated before, the purpose of reinforcement learning is to learn behaviors that maximize the rewards obtained in the future. It is possible to learn more complicated tasks using deep reinforcement learning (DRL), which combines deep learning with reinforcement learning. As such, the reinforcement learning algorithms utilized by the traffic control system 170 may be a DRL algorithm.

In one example, the controlled vehicle 100 may be controlled by deep Q-network (DQN), a type of learning technique based on reinforcement learning. This type of architecture combines a convolutional neural network with Q-learning, which learns the value of selecting action a in state s. The agent learns the optimal action-value based on the rewards obtained from the environment. This action-value function was updated using the following equation:

$$Q(s_t,a_t) \leftarrow Q(s_t,a_t) + \eta(R_{t+1} + \gamma \max aQ(s_{t+1},a) - Q(s_t,a_t))$$

The agent transitions to state $s_{t+1}$ by selecting action at in state $s_t$ and receives reward $r_{t+1}$ at the same time. Q-learning trains the value of $Q(s_t, a_t)$ to approach the value of $R_{t+1}+\gamma \max Q$ (st+1, a). The Huber function was used as an error function to minimize the difference between both values. The agent transitions to state $s_{t+1}$ by selecting action at in state $s_t$ and receives reward $r_{t+1}$ at the same time. Q-learning trains the value of Q $(s_t, a_t)$ to approach the value of $R_{t+1}+\gamma \max a Q(s_{t+1}, a)$. The Huber function was used as an error function to minimize the difference between both values.

$\eta$ is the learning rate that represents the updated range of the Q-value, and $\gamma$ is the discount rate that determines by how much the future reward is considered. The action of each controlled vehicle was randomly chosen with the probability $\varepsilon$ of the equation below by the $\varepsilon$-greedy method, and the behavior with the highest Q-value was selected with the probability $1-\varepsilon$.

$$\varepsilon = P_{end} + (P_{start} - P_{end}) * e^{(-Drate*StepNum)}$$

Furthermore, double DQN (DDQN), dueling network, and prioritized experience (PER) may be applied to improve learning performance. The same structure at the main and target networks was used in DDQN. In PER, the data which earned the reward was preferentially selected from the replay memory. Tables 1 and 2 show the structure of DQN and the hyperparameters on each method.

TABLE 1

Architecture of the deep Q-network

| | Number of Filters | Filter Size | Stride | Activation |
|---|---|---|---|---|
| Input | — | — | — | — |
| Convolution | 32 | 8 × 8 | 4 × 4 | ReLu |
| Convolution | 32 | 4 × 4 | 2 × 2 | ReLu |
| Convolution | 64 | 4 × 4 | 2 × 2 | ReLu |
| Convolution | 128 | 4 × 4 | 2 × 2 | ReLu |
| Flatten | — | — | — | — |
| Fully connected | — | — | — | ReLu |
| Fully connected | — | — | — | — |

TABLE 2

Parameter of Deep Reinforcement Learning

| Parameters | Value |
|---|---|
| Replay buffer memory | 50000 |
| Target synchronization | 10000 |
| Learning rate | 0.00025 |
| Decay Rate (Drate) | 0.000005 |
| Discount Factor | 0.95 |
| Mini batch size | 32 |

TABLE 2-continued

Parameter of Deep Reinforcement Learning

| Parameters | Value |
|---|---|
| Rewarded experience replay | 25% |
| Loss function | Huber loss |
| Optimization algorithm | RMSProp |
| Initial exploration rate ($P_{start}$) | 1.0 |
| Final exploration rate ($P_{end}$) | 0.01 |

The actions determined by reinforcement learning were divided into discrete and continuous values, and DQN handled the former. In an example simulation, five types of actions were used as outputs: accelerate, remain, and decelerate the vehicle speed, change the lane to the right, change the lane to the left. For accelerate, remain, and decelerate, the speed was changed by giving +0.3 G, 0.0 G, and −0.1 G acceleration, respectively. The deceleration was set to a value that did not cause sudden braking. When the number of controlled vehicles was N, 3×N images were independently inputted to DQN as a state $s_t$, and N actions were outputted in one step in the simulation.

Regarding the reward, one example of a reward for stopping the anomaly vehicle by a controlled vehicle may be expressed as follows:

Reward=1 (if controlled vehicle succeed in stopping the anomaly vehicle), Reward=0 (otherwise).

Of course, this is just one example of the reward(s) that may be utilized. As such, other equations, or combinations thereof, may be utilized as well.

Figure 5:
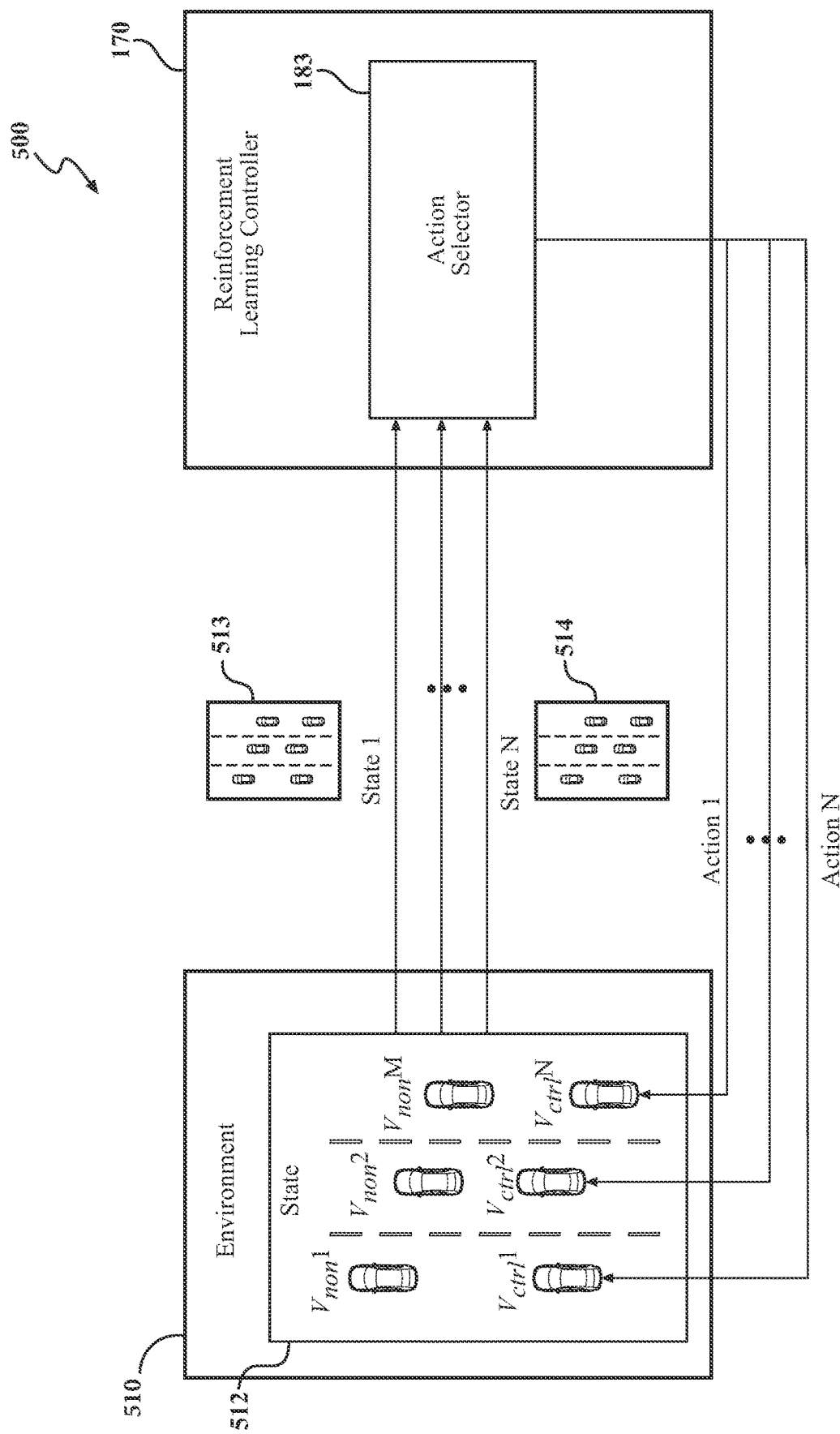
FIG. 5 illustrates a flow diagram for testing the system for controlling traffic.

Referring to FIG. 5, this figure is like FIG. 4 but differs in the fact that this flow diagram 500 relates to the inference phase (sometimes referred to as the testing phase). Here, the traffic control system 170 is operating, as it would be when deployed in the field, as opposed to being trained. Similarly, the state 512 of the environment 510 is provided to the traffic control system 170 (states 513 and/or 514). Based on the states, the action selector module 183 may take any one of several different actions previously mentioned, which are then fed back into the environment 510.

Figure 7:
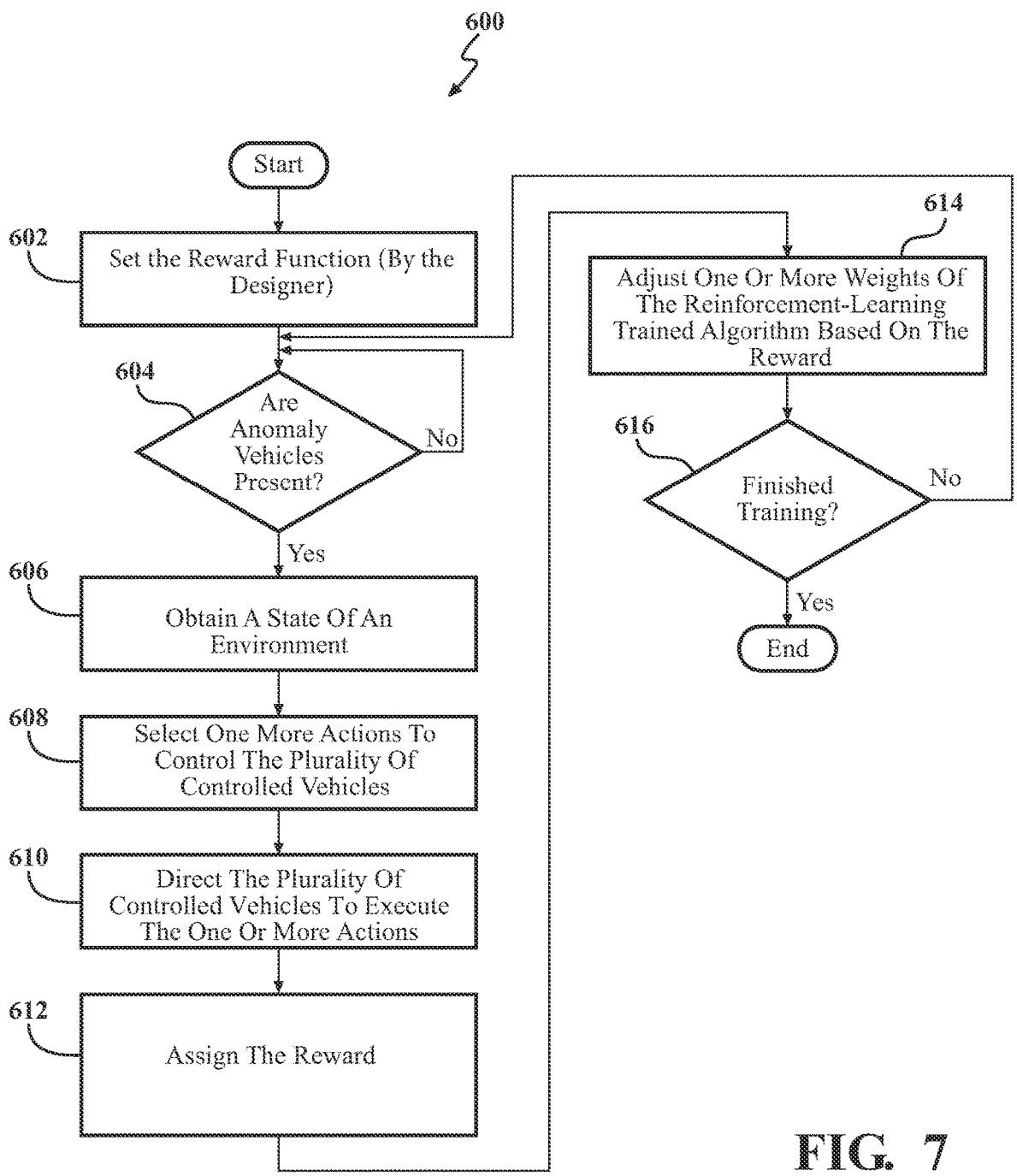
FIG. 7 illustrates a method for training a system for controlling traffic.

Referring to FIG. 7, a method 600 for training the reinforcement-learning algorithm for the traffic control system 170 is shown. The method 600 will be described from the viewpoint of the controlled vehicle 100 of FIG. 2 and the traffic control system 170 of FIG. 3. However, this is just one example of implementing the method 600. While method 600 is discussed in combination with the traffic control system 170, it should be appreciated that the method 600 is not limited to being implemented within the traffic control system 170, but is instead one example of a system that may implement the method 600.

In step 602, the reward controller module 186 of the training module 185 causes the processor(s) 110 to generate a reward based on reward function. The reward function generally describes how the controlled vehicle 100 ought to behave. In one example, the reward function may be based on one or more of the following: an average speed of the one or more anomaly vehicles or other vehicles on the road, a number of lane changes of the one or more anomaly vehicles or other vehicles on the road, a number of braking events of the one or more anomaly vehicles or other vehicles on the road and/or a number of acceleration events of the one or more anomaly vehicles or other vehicles on the road. The reward function may be set by the designer.

In step 604, the anomaly detection module 182 causes the processor(s) 110 to determine if any anomaly vehicles are present. Anomaly vehicles may be determined to be present based on information received the sensor system 120 and, more specifically, the environment sensor(s) 122. Anomaly vehicles may also be detected by receiving information from the transceiver(s) 143 from other vehicles, roadside units, central servers, and/or the anomaly vehicles themselves. Based on the information received from either the sensor system 120 and/or the transceiver(s) 143, the anomaly detection module 182 causes the processor(s) 110 to determine if any of the vehicles are performing abnormal actions and should be classified as anomaly vehicles. As stated before, abnormal actions could include speeds outside a specific range, excessive lane changes, excessive acceleration events, excessive braking events, use of lights/horns/hazard lights, etc.

In step 606, the environment module 181 causes the processor(s) 110 to obtain a state of the environment. One or more of the environment sensor 122 may determine the state of the environment. Information regarding the state of the environment can also be obtained from systems external from the controlled vehicle 100. For example, state information may be obtained from external devices, such as other vehicles, roadside units, central servers, and like by communicating with other vehicles, roadside units, central servers, and the like via a wired or wireless connection. Further, the state information may include map-related data regarding one or more roadways that the controlled vehicle 100 is operating on. In one example, one or more data stores 150, which may be like the data store 190, may include map data 151.

In step 608, the action selector module 183 causes the processor(s) 110 to select one or more actions to control the one or more controlled vehicles, such as controlled vehicle 100. In step 610, the direction module 184 causes the processor(s) 110 to pilot the vehicle using one or more vehicle systems 130.

In step 612, the reward controller module 186 assigns the reward. The reward may be assigned on a specific action is taken that satisfies the reward function. The reward may be a positive reward or could be a negative reward based on anyone of a number of factors such as an average speed of the one or more anomaly vehicles or other vehicles on the road, a number of lane changes of the one or more anomaly vehicles or other vehicles on the road, a number of braking events of the one or more anomaly vehicles or other vehicles on the road and/or a number of acceleration events of the one or more anomaly vehicles or other vehicles on the road.

In step 614, the training module 185 may cause the processor(s) 110 to adjust one or more reinforcement learning algorithm weights 191 based on the reward that has been assigned in step 608.

Thereafter, step 616, the training module 185 determines of training should be finished or not. If training is not to be finished, the method 600 returns to step 604; otherwise, the method 600 ends.

Figure 8:
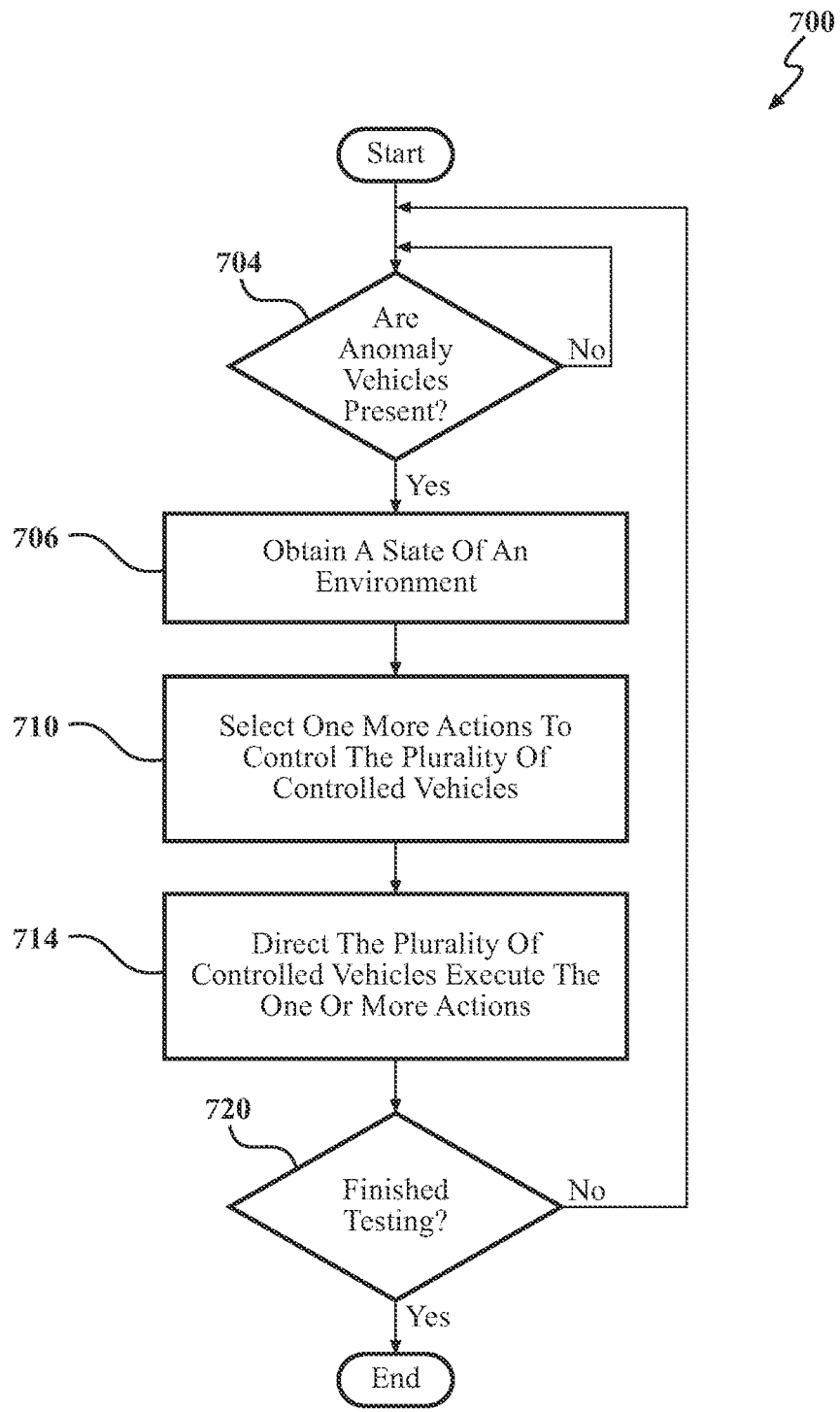
FIG. 8 illustrates a method for controlling traffic using one or more controlled vehicles.

Referring to FIG. 8, a method 700 for testing the traffic control system 170 is shown. The method 700 will be described from the viewpoint of the controlled vehicle 100 of FIG. 2 and the traffic control system 170 of FIG. 3. However, this is just one example of implementing the method 700. While method 700 is discussed in combination with the traffic control system 170, it should be appreciated that the method 700 is not limited to being implemented within the traffic control system 170, but is instead one example of a system that may implement the method 700.

In step 704, like step 604, the anomaly detection module 182 causes the processor(s) 110 to determine if any anomaly vehicles are present. Anomaly vehicles may be determined to be present based on information received the sensor system 120 and, more specifically, the environment sensor(s) 122. Anomaly vehicles may also be detected by receiving information from the transceiver(s) 143 from other vehicles, roadside units, central servers, or the anomaly vehicles themselves. Based on the information received from either the sensor system 120 and/or the transceiver(s) 143, the anomaly detection module 182 causes the processor(s) 110 to determine if any of the vehicles are performing abnormal actions and should be classified as anomaly vehicles. As stated before, abnormal actions could include speeds outside a specific range, excessive lane changes, excessive acceleration events, excessive braking events, use of lights/horns/hazard lights, etc.

In step 706, the environment module 181 causes the processor(s) 110 to obtain a state of the environment. The state of the environment may be determined by one or more of the environment sensor(s) 122. Information regarding the state of the environment can also be obtained from systems external from the controlled vehicle 100. For example, state information may be obtained from external devices, such as other vehicles, roadside units, central servers, and like by communicating with other vehicles, roadside units, central servers, and the like via a wired or wireless connection. Further, the state information may include map-related data regarding one or more roadways that the controlled vehicle 100 is operating on. In one example, one or more data stores 150, which may be like the data store 190, may include map data 151.

In step 710, the action selector module 183 causes the processor(s) 110 to select one or more actions to control the one or more controlled vehicles, such as controlled vehicle 100. In step 714, the direction module 184 causes the processor(s) 110 to pilot the vehicle using one or more vehicle systems 130. Thereafter, in step 720, if the method 700 is done testing, the method 700 ends, otherwise, the method 700 returns to step 704.

FIG. 1 will now be discussed in full detail as an example environment within which the system and methods disclosed herein may operate. In one or more embodiments, the controlled vehicle 100 is an autonomous vehicle. As used herein, "autonomous vehicle" refers to a vehicle that operates in an autonomous mode. "Autonomous mode" refers to navigating and/or maneuvering the controlled vehicle 100 along a travel route using one or more computing systems to control the controlled vehicle 100 with minimal or no input from a human driver. In one or more embodiments, the controlled vehicle 100 is highly automated or completely automated. In one embodiment, the controlled vehicle 100 is configured with one or more semi-autonomous operational modes in which one or more computing systems perform a portion of the navigation and/or maneuvering of the controlled vehicle 100 along a travel route, and a vehicle operator (i.e., driver) provides inputs to the vehicle to perform a portion of the navigation and/or maneuvering of the controlled vehicle 100 along a travel route.

In one or more arrangements, the processor(s) 110 can be a main processor of the controlled vehicle 100. For instance, the processor(s) 110 can be an electronic control unit (ECU). The controlled vehicle 100 can include one or more data stores 115 for storing one or more types of data. The data store 115 can include volatile and/or non-volatile memory. Examples of a data store 115 could include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected" or "in communication with" as used throughout this description, can include direct or indirect connections, including connections without direct physical contact.

The controlled vehicle 100 can include an input system 140. An "input system" includes any device, component, system, element, or arrangement or groups thereof that enable information/data to be entered into a machine. The input system 140 can receive an input from a vehicle passenger (e.g., a driver or a passenger). The controlled vehicle 100 can include an output system 141. An "output system" includes any device, component, or arrangement or groups thereof that enable information/data to be presented to a vehicle passenger (e.g., a person, a vehicle passenger, etc.).

The processor(s) 110, the traffic control system 170, and/or the autonomous driving module(s) 160 can be operatively connected to communicate with the vehicle systems 130 and/or individual components thereof. For example, returning to FIG. 1, the processor(s) 110 and/or the autonomous driving module(s) 160 can be in communication to send and/or receive information from the vehicle systems 130 to control the movement, speed, maneuvering, heading, direction, etc. of the controlled vehicle 100. The processor(s) 110, the traffic control system 170, and/or the autonomous driving module(s) 160 may control some or all these vehicle systems 130 and, thus, may be partially or fully autonomous.

The controlled vehicle 100 can include one or more modules, at least some of which are described herein. The modules can be implemented as computer-readable program code that, when executed by a processor(s) 110, implement one or more of the various processes described herein. One or more of the modules can be a component of the processor (s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The controlled vehicle 100 can include one or more autonomous driving module(s) 160. The autonomous driving module(s) 160 can be configured to receive data from the sensor system 120 and/or any other type of system capable of capturing information relating to the controlled vehicle 100 and/or the external environment of the controlled vehicle 100. In one or more arrangements, the autonomous driving module(s) 160 can use such data to generate one or more driving scene models. The autonomous driving module(s) 160 can determine the position and velocity of the controlled vehicle 100. The autonomous driving module(s) 160 can determine the location of obstacles, obstacles, or other environmental features, including traffic signs, trees, shrubs, neighboring vehicles, pedestrians, etc.

The autonomous driving module(s) 160 can be configured to receive, and/or determine location information for obstacles within the external environment of the controlled vehicle 100 for use by the processor(s) 110, and/or one or more of the modules described herein to estimate the position and/or orientation of the controlled vehicle 100, vehicle position in global coordinates based on signals from a plurality of satellites, or any other data and/or signals that could be used to determine the current state of the controlled vehicle 100 or determine the position of the controlled vehicle 100 with respect to its environment for use in either creating a map or determining the position of the controlled vehicle 100 in respect to map data.

The autonomous driving module(s) 160 either independently or in combination with the traffic control system 170 can be configured to determine travel path(s), current autonomous driving maneuvers for the controlled vehicle 100, future autonomous driving maneuvers and/or modifications to current autonomous driving maneuvers based on data acquired by the sensor system 120, driving scene models, and/or data from any other suitable source such as determinations from the sensor data 250 as implemented by the transmission module 230. "Driving maneuver" means one or more actions that affect the movement of a vehicle. Examples of driving maneuvers include accelerating, decelerating, braking, turning, moving in a lateral direction of the controlled vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the controlled vehicle 100 or one or more systems thereof (e.g., one or more of vehicle systems 130).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product, which comprises all the features enabling the implementation of the methods described herein, and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, module, as used herein, includes routines, programs, objects, components, data structures, and so on that perform tasks or implement data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for traffic control system comprising:
one or more processors; and
a memory in communication with the one or more processors, the memory having:
an environment module having instructions that, when executed by the one or more processors, causes the one or more processors to obtain a state of an environment having a universe of vehicles operating therein,
an anomaly detection module having instructions that, when executed by the one or more processors, causes the one or more processors to identify one or more anomaly vehicles operating in a nonautonomous mode from the universe of vehicles operating in the environment based on a prior performance of one or more abnormal actions,
an action selector module having instructions that, when executed by the one or more processors, causes the one or more processors to select one or more actions to control a plurality of controlled vehicles to control the operation of one or more anomaly vehicles, and
a direction module having instructions that, when executed by the one or more processors, causes the one or more processors to direct the plurality of controlled vehicles to execute the one or more actions to prevent the one or more anomaly vehicles operating in the nonautonomous mode from performing the one or more abnormal actions performed in the prior performance in a subsequent performance.

2. The system of claim 1, wherein the action selector module further comprises instructions that, when executed by the one or more processors, causes the one or more processors to select the one or more actions by utilizing a reinforcement-learning trained algorithm.

3. The system of claim 2, wherein the memory further comprises a reward controller module that, when executed by the one or more processors, causes the one or more processors to generate a reward based on a reward function and adjust one or more weights of the reinforcement-learning trained algorithm based on the reward.

4. The system of claim 3, wherein the reward function is based on at least one of:
   an average speed of the one or more anomaly vehicles;
   a number of lane changes of the one or more anomaly vehicles;
   a number of braking events of the one or more anomaly vehicles; and
   a number of acceleration events of the one or more anomaly vehicles.

5. The system of claim 1, wherein the one or more abnormal actions includes a number of lane changes over a period of time and a vehicle speed outside a specific range.

6. The system of claim 1, wherein a number of the plurality of controlled vehicles is equal to or greater than a number of the one or more anomaly vehicles.

7. A method for controlling a plurality of controlled vehicles comprising the steps of:
   obtaining a state of an environment having a universe of vehicles operating therein;
   identifying one or more anomaly vehicles operating in a nonautonomous mode from the universe of vehicles operating in the environment based on a prior performance of one or more abnormal actions;
   selecting one or more actions to control the plurality of controlled vehicles to control the operation of one or more anomaly vehicles; and
   directing the one or more controlled vehicles to execute the one or more actions to prevent the one or more anomaly vehicles operating in the nonautonomous mode from performing the one or more abnormal actions performed in the prior performance in a subsequent performance.

8. The method of claim 7, wherein a number of the plurality of controlled vehicles is equal to or greater than a number of the one or more anomaly vehicles.

9. The method of claim 7, wherein the step of selecting the one or more actions is performed by a reinforcement-learning trained algorithm.

10. The method of claim 9, further comprising the steps of:
    generating a reward based on a reward function; and
    adjusting one or more weights of the reinforcement-learning trained algorithm based on the reward.

11. The method of claim 10, wherein the reward function being based on at least one of:
    an average speed of the one or more anomaly vehicles;
    a number of lane changes of the one or more anomaly vehicles;
    a number of braking events of the one or more anomaly vehicles; and
    a number of acceleration events of the one or more anomaly vehicles.

12. The method of claim 7, wherein the one or more abnormal actions includes a number of lane changes over a period of time and a vehicle speed outside a specific range.

13. A non-transitory computer-readable medium storing instructions for controlling a plurality of controlled vehicles that, when executed by one or more processors, cause the one or more processors to:
    obtain a state of an environment having a universe of vehicles operating therein;
    identify one or more anomaly vehicles operating in a nonautonomous mode from the universe of vehicles operating in the environment based on a prior performance of one or more abnormal actions;
    select one or more actions to control the plurality of controlled vehicles to control the operation of one or more anomaly vehicles; and
    direct the plurality of controlled vehicles to execute the one or more actions to prevent the one or more anomaly vehicles operating in the nonautonomous mode from performing the one or more abnormal actions performed in the prior performance in a subsequent performance.

14. The non-transitory computer-readable medium of claim 13, wherein a number of the plurality of controlled vehicles is equal to or greater than a number of the one or more anomaly vehicles.

15. The non-transitory computer-readable medium of claim 13, wherein the one or more anomaly vehicles are operating in a nonautonomous mode.

16. The non-transitory computer-readable medium of claim 13, further comprising instructions that, when executed by one or more processors, cause the one or more processors to select the one or more actions by using a reinforcement-learning trained algorithm.

17. The non-transitory computer-readable medium of claim 16, wherein the reinforcement-learning trained algorithm was trained to maximize a reward function, the reward function being based on at least one of:
    an average speed of the one or more anomaly vehicles;
    a number of lane changes of the one or more anomaly vehicles;
    a number of braking events of the one or more anomaly vehicles; and
    a number of acceleration events of the one or more anomaly vehicles.

18. The non-transitory computer-readable medium of claim 16, wherein the reinforcement-learning trained algorithm is a deep reinforcement-learning trained algorithm.

19. The non-transitory computer-readable medium of claim 13, wherein the one or more abnormal actions includes a number of lane changes over a period of time and a vehicle speed outside a specific range.

\* \* \* \* \*